United States Patent
Rieger et al.

(10) Patent No.: US 7,381,679 B2
(45) Date of Patent: Jun. 3, 2008

(54) CATALYST COMBINATION, ISOTACTIC POLYMERS AND ALSO A METHOD FOR PRODUCING LINEAR ISOTACTIC POLYMERS AND THE USE THEREOF

(75) Inventors: Bernhard Rieger, Oberelchingen (DE); Sandra Deisenhofer, Senden (DE)

(73) Assignee: Sud-Chemie AG, Munich (DE)

( * ) Notice: Subject to any disclaimer, the term of this patent is extended or adjusted under 35 U.S.C. 154(b) by 0 days.

(21) Appl. No.: 10/543,703

(22) PCT Filed: Jan. 27, 2004

(86) PCT No.: PCT/EP2004/000694

§ 371 (c)(1),
(2), (4) Date: Mar. 1, 2006

(87) PCT Pub. No.: WO2004/067581

PCT Pub. Date: Aug. 12, 2004

(65) Prior Publication Data

US 2007/0015657 A1    Jan. 18, 2007

(30) Foreign Application Priority Data

Jan. 28, 2003   (DE)   ................. 103 03 225

(51) Int. Cl.
 *C08F 4/6192* (2006.01)
(52) U.S. Cl. ...................... 502/152; 502/103; 502/155; 526/160; 526/161; 526/165; 526/943
(58) Field of Classification Search ................ 526/160, 526/165, 161, 943; 502/103, 152, 155
See application file for complete search history.

(56) References Cited

OTHER PUBLICATIONS

Deisenhofer et al., "Asymmetric Metallocene Catalysts Based on Dibenzothiopene: A New Approach to High Molecular Weight polypropylene Plastomers", Oganometallics, 22, 3495-3501 (2003).*

* cited by examiner

*Primary Examiner*—Caixia Lu
(74) *Attorney, Agent, or Firm*—Leydig, Voit & Mayer, Ltd.

(57) ABSTRACT

The present invention relates to a catalyst combination for producing linear isotactic polymers containing an asymmetrical metal complex and also an activator.

7 Claims, 7 Drawing Sheets

Figure 1

Table 1

Figure 2:
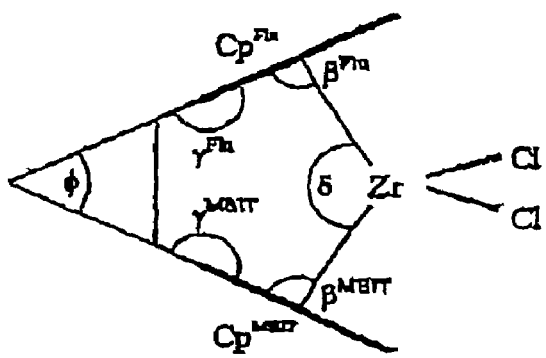

|  | 7a |
|---|---|
| Formula | $C_{31}H_{22}Cl_2SZr$ |
| Molecular weight | 588.67 |
| Crystal colour and shape | Orange, flat |
| Crystal system | Triclinic |
| Space group | P1 |
| a (Å) | 9,789(4) |
| b (Å) | 14,815(6) |
| c (Å) | 8,821(4) |
| α (°) | 102,51(4) |
| β (°) | 96,51(3) |
| γ (°) | 100,18(3) |
| V (Å³) | 1213,8(9) |
| Z | 2 |
| $D_c$ (Mg/m³) | 1,611 |
| Absorption coefficient μ (mm⁻¹) | 0,779 |
| F(000) | 596 |
| Crystal size (mm) | 0,35x0,25x0,15 |
| Scan mode | 2θ/ω |
| $θ_{max}$ (°) | 25,04 |
| Index ranges | 0 ≤ h ≤ 11 |
|  | -17 ≤ k ≤ 17 |
|  | -10 ≤ l ≤ 10 |
| Number of individual/all reflections | 4279/4551 |
| Number of observed reflections [I > 2σ(I)] | 3364 |
| Number of parameters | 316 |
| Accuracy of the adaptation for $S(F^2)$[a] | 1,019 |
| Last R indices [I > 2σ(I)][b] | $R_1$=0,0486, $wR_2$=0,1121 |
| R indices (of all data)[b] | $R_1$=0,0725, $wR_2$=0,1191 |
| Largest differential peak and hole (e/Å³) | 0,738 and -0,613 |

[a] $S = [\sum[w(F_o^2-F_c^2)^2]/(n-p)]^{1/2}$, n being the number of reflections and p the number of refined parameters

[b] $R(F) = \sum||F_o|-|F_c||/\sum|F_o|; wR(F^2) = [\sum\{w\}F_o^2-F_c^2\}^2/\sum wF_o^4]^{1/2}$ Table 2

| | 7a |
|---|---|
| $\beta^{Flu}$ (°) | 80.74 |
| $\beta^{MBIT}$ (°) | 88.33 |
| $\gamma^{Flu}$ (°) | 189.47 |
| $\gamma^{MBIT}$ (°) | 175.19 |
| $\phi$ (°) | 62.89 |
| $\delta$ (°) | 128.04 |
| Cl-Zr-Cl (°) | 96.80(6) |
| Zr-Cl(1) (Å) | 2.4116(15) |
| Zr-Cl(2) (Å) | 2.4238(17) |
| av. Zr-centroid(Cp$^{MBIT}$) (Å) | 2.530(4) |
| av. Zr-centroid(Cp$^{Flu}$) (Å) | 2.574(4) |
| Zr-centroid(Cp$^{MBIT}$) (Å) | 2.222(4) |
| Zr-centroid(Cp$^{Flu}$) (Å) | 2.271(4) |
| Zr1-C3 (Cp$^{MBIT}$) (Å) | 2.504(4) |
| Zr1-C4 (Cp$^{MBIT}$) (Å) | 2.497(5) |
| Zr1-C5 (Cp$^{MBIT}$) (Å) | 2.507(5) |
| Zr1-C6 (Cp$^{MBIT}$) (Å) | 2.571(4) |
| Zr1-C7 (Cp$^{MBIT}$) (Å) | 2.570(4) |
| Zr1-C19 (Cp$^{Flu}$) (Å) | 2.404(4) |
| Zr1-C20 (Cp$^{Flu}$) (Å) | 2.535(4) |
| Zr1-C25 (Cp$^{Flu}$) (Å) | 2.678(4) |
| Zr1-C26 (Cp$^{Flu}$) (Å) | 2.696(4) |
| Zr1-C31 (Cp$^{Flu}$) (Å) | 2.559(5) |

Figure 3

Table 3

| No. | Type | Amount[b] | $T_p$[d] | $[C_3]$[e] | Yield[f] | Activity[g] | [η][h] | $M_v$[i] | $M_w/M_n$ |
|---|---|---|---|---|---|---|---|---|---|
| 1 | 7a | 4,0 | 60 | 0,7 | 15,0 | 5,4 | 65 | 7 | 2,3 |
| 2 | 7a | 3,0 | 60 | 1,6 | 19,2 | 10,4 | 70 | 10 | 2,2 |
| 3 | 7a | 1,9 | 60 | 2,6 | 18,4 | 13,5 | 70 | 20 | 2,3 |
| 4 | 7a | 3,0 | 50 | 1,6 | 18,3 | 9,3 | 78 | 20 | 1,9 |
| 5 | 7a | 5,0 | 30 | 1,6 | 13,5 | 1,6 | 86 | 150 | 1,8 |
| 6 | 7a | 2,4 | 30 | 3,0 | 23,0 | 3,6 | 85 | 180 | 2,1 |
| 7 | 7a | 2,5 | 30 | 5,1 | 23,1 | 6,6 | 82 | 200 | 1,9 |
| 8 | 7c | 3,7 | 30 | - | 13,5 | 15,9 | 78 | 250 | 2,6 |
| 9 | 7c | 8,5 | 0 | - | 8,3 | 5,3 | 75 | 1500 | 3,8 |
| 10 | 8 | 6,0 | 60 | 1,6 | 10,6 | 2,3 | 42 | 13 | 2,5 |
| 11 | 8 | 5,0 | 60 | 2,6 | 15,7 | 4,9 | 38 | 20 | 2,1 |
| 12 | 8 | 8,0 | 50 | 1,6 | 9,4 | 1,1 | 36 | 17 | 2,1 |
| 13 | 8 | 16,0 | 30 | 1,6 | 6,3 | 0,3 | 18 | 30 | 2,2 |
| 14 | 8 | 16,0 | 30 | 3,0 | 11,8 | 0,3 | 18 | 50 | 2,3 |
| 15 | 8 | 12,0 | 30 | 5,1 | 14,5 | 0,5 | 17 | 60 | 1,9 |

[a]Toluene, Al/Zr=2000. [b]Liquid propylene borate/Hf=5.
[c][μmol]. [d][°C]. [e][mol·L$^{-1}$]. [f][g]. [g][10$^3$ kg of PP(mol Zr(C$_3$)h)$^{-1}$]. [h][%] [i][kg mol$^{-1}$]

Figure 4

Table 4

| No. | [mmmm] | [mmmr] | [mmrr] | [mrrm] |
|-----|--------|--------|--------|--------|
| 1   | 65     | 15     | 15     | 5      |
| 2   | 70     | 12     | 13     | 5      |
| 3   | 70     | 13     | 12     | 5      |
| 4   | 78     | 10     | 10     | 3      |
| 5   | 86     | 6      | 6      | 2      |
| 6   | 85     | 6      | 7      | 2      |
| 7   | 82     | 7      | 7      | 3      |

Figure 5

| Entry | Amount[a] | $T_p$[b] | [mmmm][c] | Activity[d] | Mw[e] | Mw/Mn |
|---|---|---|---|---|---|---|
| 1 | 0.25 | 20 | 69.6 | 82.11 | 863000 | 2.40 |
| 2 | 0.25 | 30 | 73.8 | 88.49 | 351000 | 2.44 |
| 3 | 0.25 | 40 | 78.5 | 90.65 | 127000 | 2.53 |
| 4 | 0.25 | 50 | 78.2 | 173.04 | 56000 | 5.63 |
| 5 | 0.25 | 60 | 73.4 | 241.65 | 22000 | 2.51 |

[a] in μmol cat. [b] In °C. [c] In %, ±2% of stated value. [d] In $10^3$ kg of PP (mol of Hf[$C_j$]b)$^{-1}$. [e] In g/mol

Figure 6

| Entry | Amount[a] | [C₃][b] | [mmmm][c] | Activity[d] | Mw[e] | Mw/Mn |
|---|---|---|---|---|---|---|
| 1 | 0.25 | 0.6 | 72.0 | 12.03 | 79000 | 2.21 |
| 2 | 0.25 | 1.35 | 81.0 | 160.44 | 154000 | 2.49 |
| 3 | 0.25 | 2.10 | 75.9 | 86.711 | 193000 | 2.84 |
| 4 | 0.25 | 2.90 | 73.8 | 88.49 | 351000 | 2.44 |
| 5 | 0.25 | 3.90 | 79.8 | 35.30 | 262000 | 2.88 |

[a] In µmol cat. [b] In mol/l. [c] In %, ±2% of stated value. [d] In 10³ kg of PP (mol of Hf[C₃]h)⁻¹. [e] In g/mol

Figure 7

| Entry | Amount[a] | $T_p$[b] | Mw[c] | Mw/Mn |
|---|---|---|---|---|
| 1 | 1.0 | 30 | 855000 | 3.93 |

[a] in μmol cat
[b] in °C
[c] in g/mol

CATALYST COMBINATION, ISOTACTIC POLYMERS AND ALSO A METHOD FOR PRODUCING LINEAR ISOTACTIC POLYMERS AND THE USE THEREOF

This application is the U.S. national phase of international patent application PCT/EP04/000694, filed on Jan. 27, 2004, and claims priority to German patent application number 103 03 225.8, filed Jan. 28, 2003, all of which are hereby incorporated by reference.

One of the major requirements in polymerisation catalysis of olefins is the control of the microstructure of the polymers, by means of which the material properties can be influenced. For example, highly active zirconocene dichlorides are known from DE 198 16 154, with which individual stereo errors along an isotactic chain can be incorporated dependent upon the monomer concentration. These asymmetrical catalysts have alkyl or alkoxy substituents in 5,6-positions of the indenyl group and lead to improved activity and hence to very high molecular weights. These 5,6-substituted metallocene catalysts thereby effect high concentrations of isolated stereo errors, which leads to soft polypropylenes with low crystallinity and outstanding elastomeric properties.

Starting from here, it was the object of the present invention to make available novel polymers with thermoplastic properties and also catalysts which make possible the polymerisation of isotactic polymers with thermoplastic properties.

This object preferably is achieved by the characterizing features of the present invention. Advantageous embodiments and further developments of the solution will be apparent from the description of the invention provided herein.

According to the invention, a catalyst combination for producing linear isotactic polymers is made available, which comprises an activator and a metal complex of the general formula I

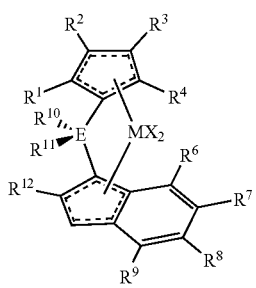

(I)

wherein the substituents have the following meaning:

$R^1$-$R^4$ linear or branched $C_1$- to $C_{10}$-alkyl, 5- to 7-membered cycloalkyl, which for its part can carry one or more $C_1$- to $C_{10}$-alkyl radicals as substituent, $C_6$- to $C_{18}$- aryl or arylalkyl or alkylaryl, $R^1/R^2$, $R^3/R^4$ being partially or at the same time able to be bonded in 5- to 7-membered anellated cycloalkyl or aryl rings, which in turn can contain heteroatom units (e.g. O,S, NR);

$R^6$-$R^9$ hydrogen, linear or branched $C_1$- to $C_{10}$-alkyl or hydrogen, linear or branched $C_1$- to $C_{10}$-alkyl, 5- to 7-membered cycloalkyl, which for its part can carry one or more $C_1$- to $C_6$-alkyl radicals as substituent, $C_6$- to $C_{18}$-aryl or arylalkyl or alkylaryl, with the proviso that the radicals $R^6/R^7$ or $R^8/R^9$ are bonded in 5- to 7-membered anellated cycloalkyl or aryl rings, the latter being able to be substituted, interrupted with heteroatoms and/or combined with a further cycloalkyl and/or aryl ring;

$R^{10}$-$R^{11}$ hydrogen, $C_1$- to $C_8$-alkyl, 4- to 7-membered cycloalkyl, aryl, $R^{10}$, $R^{11}$ together with E being able to form a 4- to 7-membered cycloalkyl or aryl;

$R^{12}$ $C_1$- to $C_8$-alkyl, aryl, $C_1$- to $C_8$-oxyalkyl, $C_1$- to $C_8$-trialkylsiloxy;

M titanium, zirconium, hafnium, vanadium, niobium, tantalum;

X hydrogen, halogen or $C_1$- to $C_8$-alkyl, aryl, benzyl;

E carbon, silicon, germanium or 1,2-ethyl, 1,3-propyl, 1,4-butyl, the radicals $R^6$-$R^9$. The ring with the substituents $R^1$-$R^4$ is thereby preferably a fluorenyl ring system which can also be substituted.

Preferably the metal complex of the general formula I represents a compound of the general formula II.

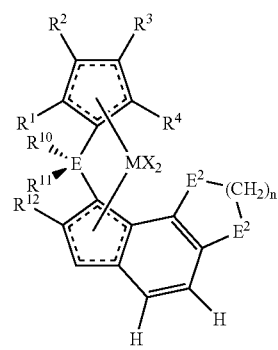

(II)

The radicals $R^1$ to $R^4$ and $R^{10}$ to $R^{12}$ and also E and $MX_2$ herein have the meaning indicated in the general formula I and $E_2$=$CH_2$, O or S and n=1 or 2. $E_2$ can thereby be the same or different.

A likewise preferred catalyst combination is based on a compound of the general formula III.

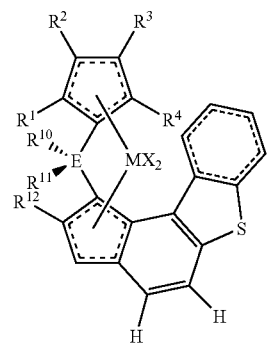

(III)

The radicals hereby have the meaning indicated in the general formula I.

Preferably the catalyst combination contains as metal complex a compound of the general formula IV

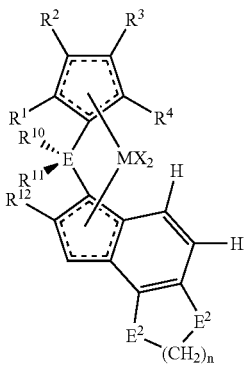

(IV)

wherein the radicals $R^1$ to $R^4$ and $R^{10}$ to $R^{12}$ and also E and $MX_2$ have the meaning indicated in the general formula I and $E^2=CH_2$, O or S and n=1 or 2. $E_2$ can be the same or different.

The catalyst combination can, in a further advantageous development, have as metal complex a compound of the general formula V.

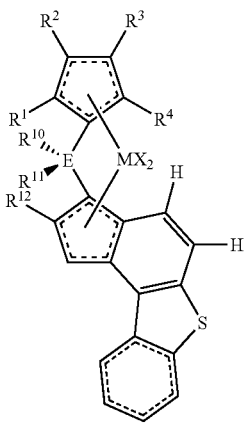

(V)

The radicals hereby again have the meaning indicated in the general formula I.

A further advantageous variant is the metal complex of the general formula XII

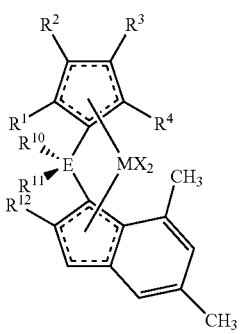

(XII)

The radicals $R^1$ to $R^4$ and also $R^{10}$ to $R^{12}$ and also E and $MX_2$ herein have the meaning indicated in the general formula I.

A likewise preferred catalyst combination is based on a compound of the general formula XIII

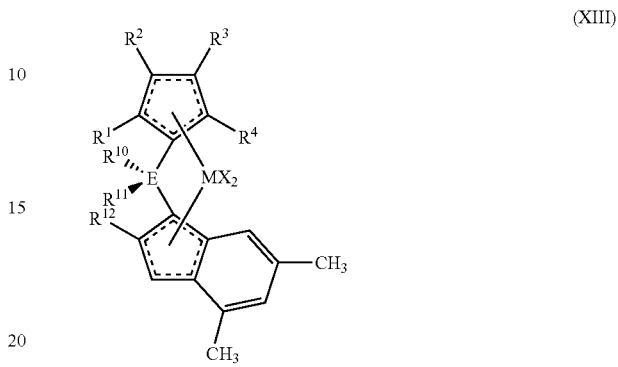

(XIII)

The radicals $R^1$ to $R^4$ and $R^{10}$ to $R^{12}$ and also E and $MX_2$ hereby have the meaning indicated in the general formula I.

Preferably the activator is an open-chain or cyclic alumoxane compound of the general formula VI or VII

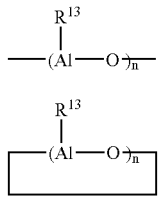

(VI)

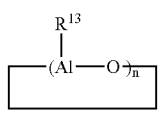

(VII)

$R^{13}$ hereby means a $C_1$- to $C_4$-alkyl group and n a number between 5 and 30.

Cationic activators of the general formula VIII to XI can likewise be contained in the catalyst combination.

$B(C_6F_5)_3, Al(C_6F_5)_3$ (VIII)

$R^{14}{}_3C[B(C_6F_5)_4], R^{14}{}_3C[Al(C_6F_5)_4]$ (IX)

$[R^{14}{}_3NH][B(C_6F_5)_4], [R^{14}{}_3NH][Al(C_6F_5)_4]$ (X)

$R^{14}{}_3C[C_5R^{15}{}_5], [R^{14}{}_3NH][C_5R^{15}{}_5]$ (XI)

$R^{14}$ hereby means a $C_1$- to $C_4$-alkyl group or an aryl group and $R^{15}$ a perfluorinated alkyl or aryl radical.

Further suitable alternatives are described in WO 03/082879 A1 (e.g. from claim 40) and WO 03/082466 A1 (e.g. from claim 11). Therefore explicit reference is made to the disclosure content.

The previously mentioned activators can thereby be present both separately and in combination.

Preferably the metal complex and the activator according to the general formulae VI to XI are present in such quantities that the atomic ratio between aluminium from the alumoxane and/or boron (res. aluminium) from the cationic activator and the transition metal from the metal complex are present in the range of 1:1 to $10^6$:1.

With the catalyst combination according to the invention, it is possible to make available a new group of flexible polypropylene thermoplastic materials with an isotacticity of above 60% pentadiene concentration [mmmm] and a very high molecular weight of up to $5.0 \times 10^6$ g/mol. This group of polymers thereby fits in outstandingly between the soft thermoplastic elastomers and the rigid polypropylene materials which have a virtually perfect isotactic microstructure.

According to the invention, likewise a method for producing linear isotactic polymers is made available. In the case of the method according to the invention for producing linear isotactic polymers, which are constructed from at least one monomer of a C2- to C20-olefin, C2- to C20-olefin is converted in the presence of a catalyst combination such as described previously. A polymer is obtained the tacticity of which is greater than 60% [mmmm] pentadiene concentration. The polymerisation reaction is thereby preferably implemented in the gas phase, in suspensions or in supercritical monomers, in particular in solvents which are inert under the polymerisation conditions. As inert solvents, those solvents should thereby be used which contain no reactive molecules. Examples thereof are benzene, toluene, xylene, ethylbenzene or alkanes, such as for example propane, n-butane, i-butane, pentane, hexane, heptane or mixtures thereof. The polymerisation can be implemented under conditions which are known per se. It is hereby favourable if operations take place at pressures of 1 to 100 bar, preferably of 3 to 20 bar and in particular of 5 to 15 bar. As suitable temperatures, those should be considered which are in the range of -50 to 200° C., preferably 10 to 150° C. and in particular at 20 to 40° C.

The method comprises, as mentioned previously, the reaction of a $C_2$- to $C_{20}$-olefin and also if necessary further monomers and a catalyst combination comprising at least one activator of the general formula VI to XI in the presence of at least one metal complex of the general formula I to V.

The activator is preferably an open-chain or cyclic alumoxane compound of the general formula VI or VII

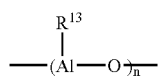
(VI)

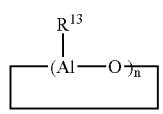
(VII)

$R^{13}$ hereby means a $C_1$- to $C_4$-alkyl group and n a number between 5 and 30.

Cationic activators of the general formula VIII to XI can likewise be contained in the catalyst combination, $$B(C_6F_5)_3, Al(C_6F_5)_3 \quad (VIII)$$

$$R^{14}{}_3C[B(C_6F_5)_4], R^{14}{}_3C[Al(C_6F_5)_4] \quad (IX)$$

$$[R^{14}{}_3NH][B(C_6F_5)_4], [R^{14}{}_3NH][Al(C_6F_5)_4] \quad (X)$$

$$R^{14}{}_3C[C_5R^{15}{}_5], [R^{14}{}_3NH][C_5R^{15}{}_5] \quad (XI)$$

$R^{14}$ hereby means a $C_1$- to $C_4$-alkyl group or an aryl group and $R^{15}$ a perfluorinated alkyl or aryl radical.

Further suitable alternatives are described in WO 03/082879 A1 (e.g. from claim 40) and WO 03/082466 A1 (e.g. from claim 11). Therefore explicit reference is made to the disclosure content.

The previously mentioned activators can thereby be present both separately and in combination, Preferably the metal complex and the activator according to the general formulae VI to XI are present in such quantities that the atomic ratio between aluminium from the alumoxane and/or boron or respectively aluminium from the cationic activator and the transition metal from the metal complex are present in the range of 1:1 to $10^6$:1.

The invention relates furthermore to a novel isotactic polymer with thermoplastic properties.

An essential element of the new isotactic polymers according to the invention is that the latter have a tacticity greater than 60% [mmmm] pentadiene concentration. At the same time, these polymers according to the invention have a molecular weight up to 5,000,000 g/mol with a TG of -50 to 30° C. The polymers according to the invention hence concern the first ultrahigh molecular polyolefins which can have a molecular weight of up to 5,000,000 g/mol. It is thereby preferred that the tacticity is in the range of greater than 60% to 98%. The molecular weight is thereby preferably in the range of 1,000,000 to 3,000,000 g/mol, particularly preferred in the range of 1.3 to 2,000,000 g/mol. As explained previously, these novel thermoplastic polymers can be produced preferably with a catalyst combination as described previously. From the point of view of materials, the polymers according to the invention can be constructed from all $C_2$- to $C_{20}$-olefins. As olefins, $C_3$- to $C_{20}$-alk-1-ene are preferably used. Examples thereof are propene, 1-butene, 2-butene, 1-pentene, 1-hexene, 1-octene, 1-nonene, 1-decene, 1-dodecene, 1-hexadecene, 1-octadecene or 1-eicosane. As olefin, a $C_5$- to $C_{20}$-cycloolefin can also be possible. Examples in the case of cycloolefins are cyclopentene, cyclohexene, norbornene and its derivatives. It is particularly preferred if polypropylene is used as olefin, The isotactic polymers according to the invention can obviously be constructed also as copolymers constructed from polypropylene and a $C_4$- to $C_{20}$-olefin and/or a cycloolefin. The isotactic polymer according to the invention can also be a terpolymer constructed from propylene, a $C_2$- to $C_{20}$-olefin and a cycloolefin. Furthermore, all additives known from the state of the art can be contained. Examples thereof are fillers, plasticisers and nucleation agents.

The linear isotactic polymer according to the invention can of course be made available per se also as a granulate, as is known from polymer chemistry, so that it can be further processed without difficulty.

Possible application fields of the isotactic polymers described here are films, threads, moulded articles etc.

The present invention is explained subsequently in more detail with reference to several production examples for the catalysts and with reference to polymerisation examples.

The results are presented in FIGS. 1 to 7 (Tables 1 to 7).

In the following examples, reference is made to the following compounds.

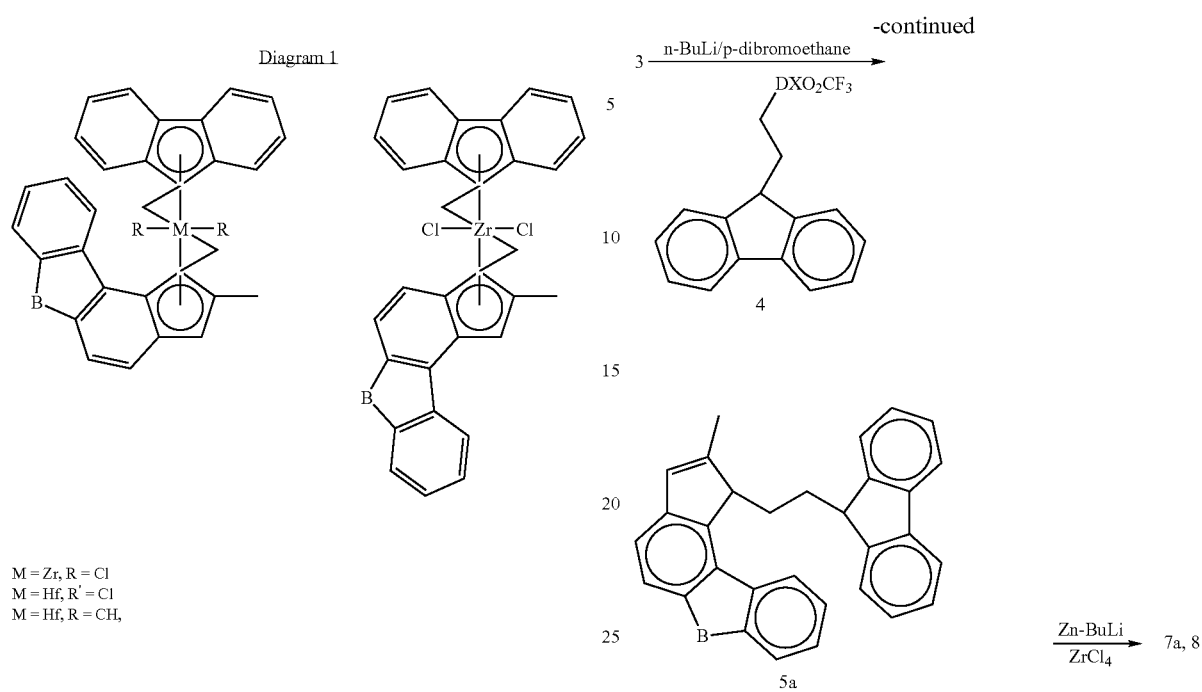

Diagram 1

M = Zr, R = Cl
M = Hf, R' = Cl
M = Hf, R = CH₃

EXAMPLE 1

Production of the Compounds

The compounds according to the invention were synthesised according to the following reaction diagram:

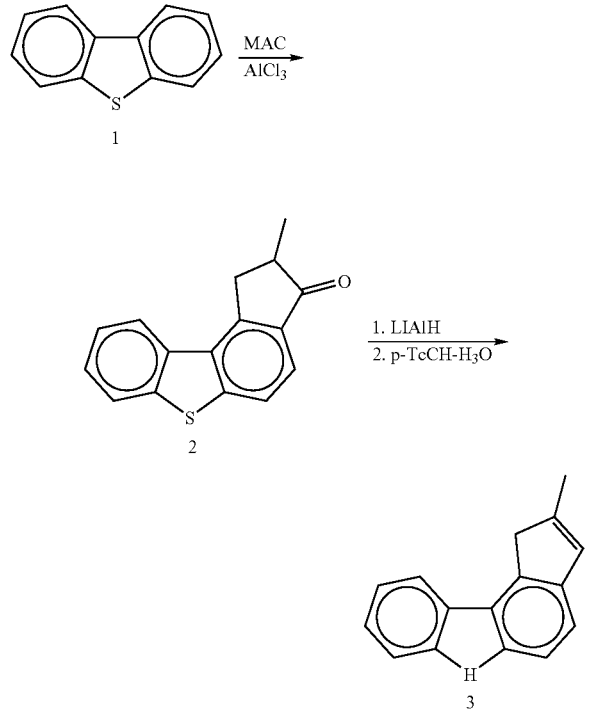

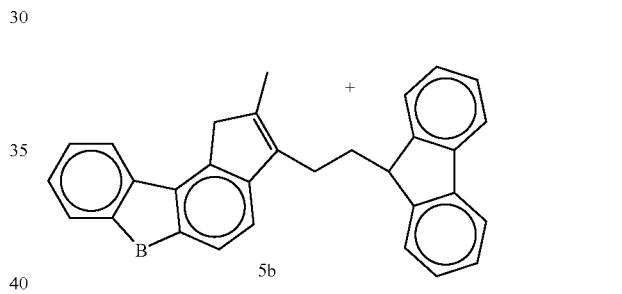

A. Production of 2-methyl-1H-benzo[b]indeno{4,5-d)thiophene 20 g (108.7 mmol) of dibenzothiophene (1) were added at −78° C. to an agitated solution of 10.6 ml methacryloyl chloride (108.7 mmol) and 15.3 g $AlCl_3$ (114.8 mmol) in 250 ml methylene chloride and brought to room temperature overnight. The solution was hydrolysed carefully at 0° C., the organic phase was separated, washed with an aqueous solution of $K_2CO_3$ and dried over $Na_2SO_4$. After removal of the solvent and crystallisation in toluene/pentane≈10:1, 2-methyl-1,2-dihydrobenzo[b]indeno[4,5-d]thiophen-3-one (2) was obtained as crystalline solid material (21.6 g, 85.9 mmol, 79%).

16.8 (66.7 mmol) 2-methyl-1,2-dihydrobenzo[b]indeno[4,5-d]thiophen-3-one (2), diluted in 50 ml THF, were added at 0° C. to a suspension of 0.9 g $LiAlH_4$ in 100 ml THF. The reaction mixture was agitated overnight and hydrolysed carefully with ice and aqueous HCl. After separation of the organic phase, the solution was neutralised with an aqueous solution of $K_2CO_3$ and dried over $Na_2SO_4$. After evaporation of the solvent and washing with $Et_2O$, the diastereomeric alcohol was obtained as a crystalline solid material (16.6 g, 65.4 mmol, 98%).

The diastereomeric alcohol (16.6 g, 65.4 mmol) was dissolved in 100 ml toluene and 1.0 g of p-toluene-sulphonic acid was added. The solution was heated under reflux and use of a water separation apparatus until no further water was formed. The reaction mixture was neutralised by washing with aqueous KOH and dried over $Na_2SO_4$. After evaporation of the solvent, 2-methyl-1H-benzo[b]indeno[4,5-d]thiophene (3) was obtained as a crystalline solid material (14.9 g, 63.1 mmol, 97%).

on: $^1$H NMR (400 MHz, $CDCl_3$) δ 1.37 (d, 3H, $CH_3$), 2.84, 3.22 (2m, 2H, $CH_2$, indanone ring), 3.94 (m, 1H, CH, indanone system), 7.45, 7.80, 8.22 (3m, 6H, aromatic). MS (GC-MS) m/z 252 ($M^+$, 100%).

Calculated analytically: C, 76.19; H, 4.76.

Found: C, 76.05; H, 4.72.

ol: $^1$H NMR (400 MHz, $CDCl_3$) δ 1.28 (d, 3H, $CH_3$), 1.75 (wide, 1H, OH-group), 2.43, 2.88 (2m, 2H, $CH_2$, indanole ring), 3.72 (m, 1H, CH, indanole ring), 4.85 (d, 1H, CH, indanole ring), 7.67 (d, 1H, aromatic), 7.40, 7.80, 8.13 (3m, 5H, aromatic). MS (GOC-MS) m/z 254 ($M^+$, 100%).

Calculated analytically: C, 75.59; H, 5.51.

Found: C, 75.45; H, 5.56.

(3): $^1$H NMR (400 MHz, $CDCl_3$) δ 2.29 (s, 3H, $CH_3$), 3.74 (s, 2H, $CH_2$, indene ring), 6.66 (s, 1H, CH, olefinic), 7.74 (d, 1H, aromatic), 7.48, 7.85, 8.27 (3m, 5H, aromatic). MS (GC-MS) m/z 236 ($M^+$, 100%).

Calculated analytically: C, 81.36; H, 5.08.

Found: C, 81.49; H, 5,23.

B. Production of 1-(9-fluorenyl)-2-(2-methyl-1H-benzo[b]indeno[4,5-d]thiophen-1-yl)ethane (5a) and 1-(9-fluorenyl)-2-(2-methyl-1H-benzo[b]indeno[4,5-d]thiophen-3-yl)ethane (5

2.67 g (12.72 mmol) of 2-(9-fluorenyl)ethanol was diluted in 100 ml $CH_2Cl_2$ and 1.8 ml triethylamine was added. The solution was cooled to 0° C. and $(CF_3SO_2)_2O$ (2.1 ml, 13.99 mmol) in 30 ml $CH_2Cl_2$ was added slowly. The reaction mixture was agitated for 1 hour at 0° C., washed twice with ice water and dried over $Na_2SO_4$. The solvent was removed in a vacuum and the resulting triflate (4) was diluted in 50 ml THF. The lithium salt of (3) was separated at −78° C. from 3.00 g (3) (12.72 mmol) and p-anisyl lithium (12.72 mmol) in toluene-dioxane=10:1 was produced and was isolated as a yellow solid material after agitating for 2 hours at room temperature. Subsequently, the diluted triflate (4) was added at −78° C. to a solution of the lithium salt of (3) in 50 ml THF and brought to room temperature overnight. The raw product was treated with a saturated aqueous solution of $NH_4Cl$ and washed several times with water. The organic phase was separated, dried over $Na_2SO_4$ and the solvent was evaporated. The chromatographic cleaning over silicic acid with $CH_2Cl_2$ produced a 1:1 mixture of 2 structural isomers 5a, 5b as crystalline substance (3.81 g, 8.90 mmol, 70%).

(5a): $^1$H NMR (400 MHz, $CDCl_3$) δ 1.85 (s, 3H, $CH_3$), 1.01-1.27 (m, 1H, $CH_2$ bridge), 1.42-1.68 (m, 2H, $CH_2$ bridge), 1.80-1.85 (m, 1H, $CH_2$ bridge), 3.53 (t, 1H, CH, indene), 3.64 (t, 1H, CH 9-H-fluorene), 6.45 (s, 1H, indene), 6.42, 6.56, 6.89-7.73 (m, 14H, protons of the indene system, aromatic fluorene).

(5b): $^1$H NMR (400 MHz, $CDCl_3$) δ 1.81 (s, 3H, $CH_3$), 2.07-2.13 (m, 2H; $CH_2$ bridge), 2.26-2.30 (m, 2H, $CH_2$ bridge), 3.44 (s, 2H, $CH_2$ indene), 4.00 (t, 1H, CH 9-H-fluorene), 7.06-7.97 (m, 14H, aromatic protons of the indene system, aromatic fluorene). MS (CI) m/z 428 ($M^+$, 100%).

Calculated analytically: C, 86.92; H, 5.61.

Found: C, 86.86; H, 5.73.

C. Production of rac-[1-(9-$η^5$-fluorenyl)-2-(2-methyl-benzo[b]indeno (4,5-d)thiophen-1(7a) and rac-[1-(9-$η^5$-fluore-nyl)-2-(2-methyl-benzo[b]indeno(4,5-d)thiophen-3-$η^5$-yl) ethane]zirconium dichloride (8)

0.96 g of an isomeric mixture of 5a, 5b (2.24 mmol) were diluted in 100 ml toluene/dioxane=10:1 and cooled to −78° C. After addition of 1.6 M n-BuLi in n-hexane (2.80 ml, 4.48 mmol), the reaction mixture was agitated for 4 hours at room temperature. Subsequently, the resulting lithium salt was isolated and diluted with 100 ml toluene. Cooling to −78° C. and the addition of solid $ZrCl_4$ (0.52 g, 2.24 mmol) led to the formation of an orange-coloured suspension. The mixture was agitated overnight, filtered and the remaining solid material was extracted several times with toluene. By means of fractionated crystallisation from toluene, 7a (0.34 g, 0.58 mmol, 52%) and 8 (0.12 g, 0.20 mmol, 18%) were obtained in pure form as orange-coloured solid materials.

(7a): $^1$H NMR (400 MHz, $CDCl_3$) δ 2.35 (s, 3H; $CH_3$), 3.88-3.94 (m, 1H, $CH_2$ bridge), 4.16-4.23 (m, 1H, $CH_2$ bridge), 4.55-4.71 (m, 2H, $CH_2$ bridge), 6.47 (s, 1H, indene), 5.94 (d, 1H, aromatic), 6.56 (t, 1H, aromatic), 7.13-7.92 (m, 10H, aromatic), 8.08 (d, 1H, aromatic), 8.82 (d, 1H, aromatic). MS (El) m/z 588, distribution of the isotope bands according to the expected content.

Calculated analytically: C, 63.27; H, 3.74.

Found: C, 63.39, H, 3.80.

(8): $^1$H NMR (400 MHz, $CDCl_3$) δ 2.32 (s, 3H, $CH_3$), 3.85-3.96 (m, 1H, $CH_2$ bridge), 4.04-4.12 (m, 1H, $CH_2$ bridge), 4.13-4.26 (m, 1H, $CH_2$ bridge), 4.56-4.68 (m, 1H, $CH_2$ bridge) 6.82 (s, 1H, indene), 7.05-8.10 (m, 14H, aromatic). MS (El) m/z 588, distribution of the isotope bands according to the expected content.

Calculated analytically: C, 63.27; H, 3.74.

Found: C, 63.41; H, 3.85.

D. Production of rac-[1-(9-$η^5$-fluorenyl)-2-(2-methyl-benzo[b]indeno(4,5-d)thiophen-1-∂(7b)

Corresponding to the described production of 7a, 0.83 g of an isomeric mixture of 5a, 5b (1.93 mmol), 2.41 ml 1.6 M n-BuLi in n-hexane (3.86 mmol) and 0.62 g $HfCl_4$ (1.93 mmol) were converted into 7b as yellow solid material (0.22 g, 0.33 mmol, 34%).

(7b): 1H NMR (400 MHz, $CDCl_3$) δ 2.44 (s, 3H, $CH_3$), 4.05-4.13 (m, 1H, $CH_2$ bridge), 4.27-4.36 (m, 1H, $CH_2$ bridge), 4.47-4.62 (m, 2H, $CH_2$ bridge), 6.38 (s, 1H, indene), 5.90 (d, 1H, aromatic), 6.53 (t, 1H, aromatic), 7.09-8.89 (m, 10H, aromatic), 8.08 (d, 1H, aromatic), 8.82 (d, 1H, aromatic). MS (El) m/z 676, distribution of the isotope bands according to the expected content.

Calculated analytically: C, 55.07; H, 3.26.

Found: C, 55.21; H, 3.29.

E. Production of rac-[1-(9-$η^5$-fluorenyl)-2-(2-methyl-benzo[b]indeno(4,5-d)thiophen-1-∂dimethyl (7c) 0.15 g (0.22 mmol) of rac-[1-(9-$η^5$-fluorenyl)-2-(2-methyl-benzo[b]indeno(4,5-d)thioph dichloride 7b was diluted in 50 ml $Et_2O$ and cooled to 0° C. The treatment with an excess of 1.6 M MeLi in $Et_2O$ (5.55 ml, 8.88 mmol) delivered a yellow suspension which was agitated for 1 hour at room temperature. The remaining mixture was cooled again to 0° C. and 0.8 ml dibromoethane were added in order to destroy any non-converted MeLi. After further agitation for 1 hour at room temperature, the solvent was removed in a vacuum and the remaining solid material fraction was extracted with toluene. The subsequent removal of the toluene delivered 7c as yellow solid material (0.11 g, 0.17 mmol, 78%).

(7c): $^1$H NMR (400 MHz, $CDCl_3$) δ −2.47, −1.50 (2s, 6H, $CH_3$), 2.20 (s, 3H, $CH_3$), 3.65-3.77 (m, 1H, $CH_2$ bridge), 3.94-4.06 (m, 1H, $CH_2$ bridge), 4.08-4.19 (m, 2H, $CH_2$ bridge), 6.39 (s, 1H, indene), 5.81 (d, 1H, aromatic), 6.42 (t, 1H, aromatic), 6.99-8.07 (m, 11H, aromatic), 8.78 (d, 1H, aromatic).

Calculated analytically: C, 62.40; H, 4.41.
Found: C, 62.49; H, 4.43.

EXAMPLE 2

X-Ray Images of the Complex (7a)

The complex (7a) crystallises in the triclinic space group $P_{-1}$. Suitable crystals were obtained by diffusion of pentane in a toluene solution of (7a). FIG. 1 shows the front view (FIG. 1a) and the side view (FIG. 1b). The front view thereby shows that the position of the ethylene bridge at C3 of the MBIT unit and the bond of the benzothiophene fragment at C8 and C15 of the central indene ring leads to a rear orientation of this group, the sulphur atom pointing forwards. Because of the remote position of the sulphur atom, disadvantageous intra-molecular interactions with the zirconium centre can be precluded.

The side view of the complex (7a) (FIG. 1b) shows some peculiarities of the architecture of the complex. The $Cp^{Flu}$-Zr-$Cp^{MBIT}$ angles are for δ 128.0° and for Φ 62.9°. The corresponding angles can be deduced from FIG. 2. The angle $\gamma^{Flu}$ is 189.5° and differs from the results of the bridged indenyl and fluorenyl complexes known from the state of the art, for which typically values of less than 180° were observed. The resulting improved accessibility of the zirconium centre is obviously a reason for the higher activity of the complex (7a). It was observed furthermore that the rear orientation of the angled MBIT fragment produces an intra-molecular repellent interaction of the phenyl hydrogen atoms in the rear position of the fluorenyl unit and of the rear orientated MBIT system. In order to avoid this disadvantageous steric strain, the benzothiophene part of the ligand is curved away from these hydrogen atoms, which leads to a deviation from the planar arrangement of the aromatic.

The average distance between Zr(IV) and fluorenyl carbon atoms of (7a) (2.574(4)Å) is significantly greater than the distance between Zr(IV) and the carbon atoms of the MBIT unit (2.530(4)Å), which leads to an asymmetrical arrangement of the Zr(IV) centre between the two Cp planes. The value of $\beta^{Flu}$ of 80.74° and the corresponding distance between Zr and carbon atoms in the range of 2.404 Å to 2.696 Å lead to a smaller hapticity relative to the $\eta^5$ bond. In contrast thereto, the value of $\beta^{MBIT}$ of 88.33° displays an almost ideal $\eta^5$ arrangement of the aromatic 5-membered Cp ring of the MBIT unit to Zr(IV).

The structural data of the X-ray image are illustrated in summary in Tables 1 and 2.

EXAMPLE 3

Examinations Relating to the Compounds with Respect to Polymerisation

After activation with MAO, the zirconocenes (7a), (8)/MAO proved to be suitable catalysts for the polymerisation of propylene. In Table 3, the dependences of the new heterocenes relative to the monomers and the temperature are illustrated. The compounds of types (7a), (7c) and (8) were thereby used as monomers.

The activity during polymerisation of both catalysts was increased with increasing polymerisation temperature and monomer concentration. The highest activities in the case of the MAO activation were achieved with (7a)/MAO (in Table 3: no. 3, $T_p$=60° C., 13.5×10³ kg Ppmol $Zr[C_3]h)^{-1}$), (8)/MAO making possible polypropylenes with significantly less activity, (In Table 3: no. 11, $T_p$=60° C., 4.9×10³ kg PP (mol $Zr[C_3]h)^{-1}$). Due to the fact that carbon (2.55) and sulphur (2.58) barely differ in their electro-negativities and due to the separated position of the sulphur atom, an electronic influence of the heteroatom on the activity can be precluded. The entire architecture of the complex (7a), which enables better accessibility of the Zr(IV) centre, can lead to the higher activity of (7a), In polymerisation tests with (7a)/MAO, isotactic polypropylenes with [mmmm]-pentadiene concentration in the range between 65 and 85% and molecular weights up to $2×10^5$ g/mol were achieved. Although a change in the monomer concentration had no significant influence on the tacticity, a linearly reducing stereo selectivity with increasing polymerisation temperature was able to be observed, which is in contrast to the expected chain turnover mechanisms of other asymmetric zirconocenes based on indenyl and fluorenyl units. In contrast thereto, polypropylenes of low tacticity with lower molecular weight were produced with the complex (8)/MAO (see Table 3: no. 15, Tp=30° C., [mmmm]=17%, Mw=5.9×10⁴ g/mol).

Further tests with respect to the hafnium-dimethyl complex (7c)/[$(C_6H_5)_3C^+$] [$(C_6F_5)_4B^-$] were implemented in order to achieve a further increase in the molecular weight of the thermoplastic materials, which were achieved with the complex (7a)/MAO of the same structure. The polymerisation tests in liquid propylene showed that the molecular weight could be increased up to 1.5×10⁶ g/mol at 0° C., accompanied by the effect that a slight drop in the stereo selectivity was observed. Furthermore, the borate activation led to an increase in activity up to 15.9 kg PP (mol $Zr[C^3]H)^{-1}$ at 30° C., as a result of which it is made clear that the co-catalyst enables a maximum concentration of active Zr(IV) centres. These results correspond to the already known knowledge that significantly higher molecular masses and activities were able to be achieved by borate-activated dimethyl complexes, which can be derived from the absence of the chain transfer to aluminium and higher concentrations of the active catalyst in the case of the borate activation.

In Table 4, the pentadiene distributions of the complexes 1 to 7 (see Table 3) are presented. MAO was used as activator.

EXAMPLE 4

Production of the Compounds

The compounds according to the invention were synthesised according to the following reaction diagram:

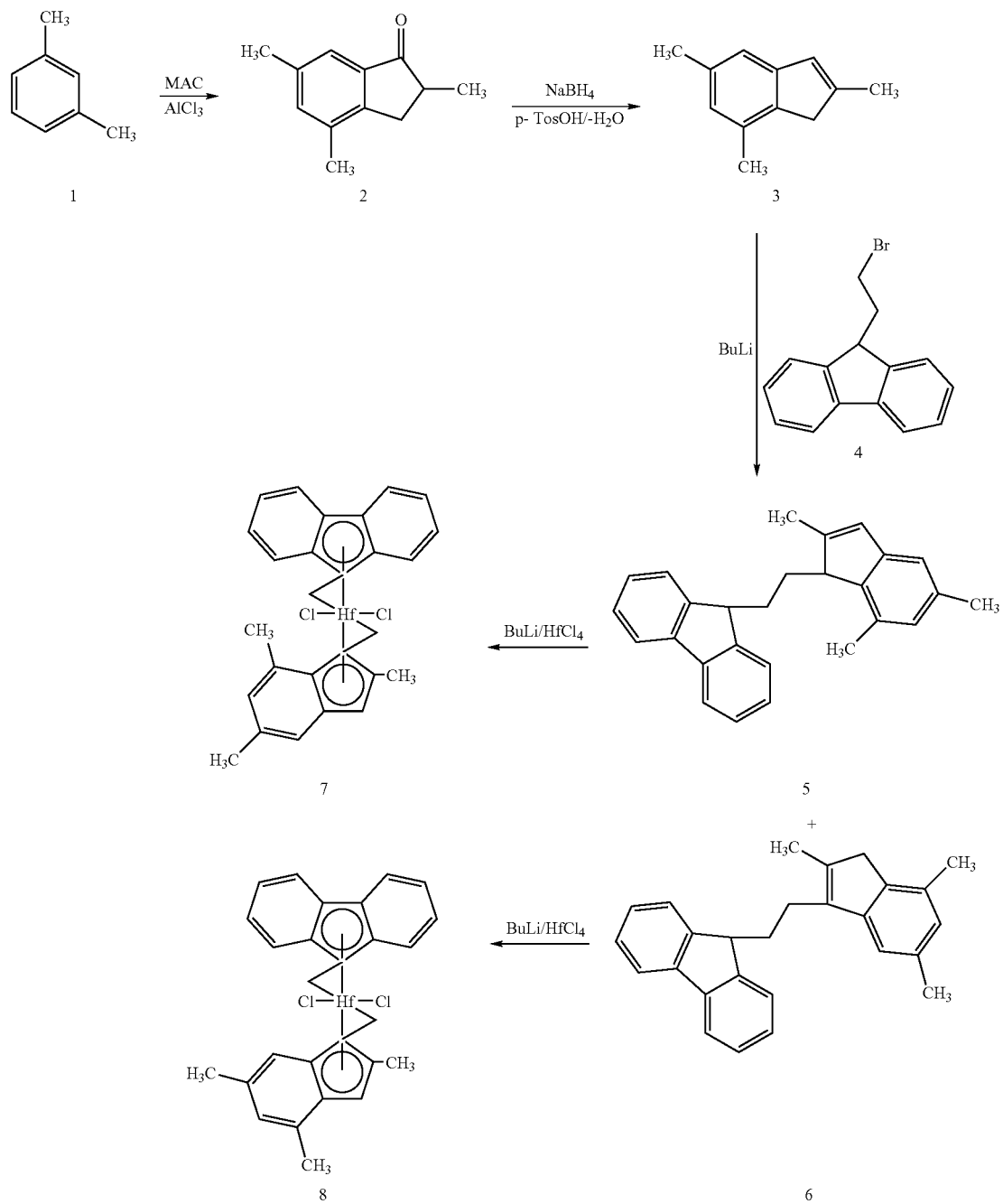

For the synthesis of the compounds according to the invention, the operation started with 2-methyl indan-1-one and, in a three-step method, the desired 2-methyl indene was obtained in a yield of over 60%. As emerges from the diagram, m-xylene (1) is converted in a first step with methacryloyl chloride. The purified indanone (2) is obtained after cleaning by distillation and Friedel-Crafts alkylation in a yield of 66%. The reduction of the indanone (2) is implemented with $NaBH_4$. The indene (3) is obtained as a viscous fluid. By reaction of the compound (4), which is produced by addition of 1,2-dibromoethane and fluorenyl lithium, the two isomers (5) and (6) are obtained in a subsequent reaction in a yield of 45%. The desired isomer 5 can then be isolated by crystallisation from toluene/hexane in a ratio of 1:2.

The conversion of the ligand (5) into the desired hafnium complex can be implemented by deprotonation with n-BuLi in a mixture of toluene/dioxane at −78° C. and with agitation for 2 hours at room temperature. Yet another subsequent addition of $HfCl_4$ in solution is required here. The reaction is implemented by agitation at room temperature for 20 hours. The hafnium complex (7) can then be isolated in a yield of 45%, The precipitated yellow complex is isolated from toluene solution and extracted with cold toluene. The toluene is then removed as quickly as possible and the yellow powder is dried under vacuum,

EXAMPLE 5

Polymerisation Example

Polymerisation of propylene in various solvents is implemented with the hafnium complex (7) produced according to the previous example 1.

A.) Polymerisation in Toluene

The polymerisation reaction in toluene is implemented in a 500 ml autoclave at constant pressure and temperature. The autoclave is filled with 250 ml toluene and with the catalyst according to example 1. Subsequently, the polymerisation temperature and the desired pressure is adjusted and propylene and a co-catalyst solution (pentafluorotetraphenyl borate are added to the reactor. The consumption of monomer was measured using a calibrated gas flowmeter (Bronkhorst F-111C-HA-33P) and the pressure was held constant during the polymerisation. Pressure/temperature and consumption of propylene were continuously determined, The polymerisation reaction was quenched with methanol and the polymer product was separated.

B.) Polymerisation in Liquid Propylene

Alternatively, a polymerisation reaction was also implemented in liquid propylene. For this purpose, the temperature of a 500 ml autoclave was set to −10° C. and the reactor filled with propylene. Subsequently, the desired polymerisation temperature of the catalyst and of the co-catalyst was provided as described above. The polymerisation reaction was likewise quenched with methanol and the obtained product isolated.

In FIGS. 5 to 7 (Tables 5 to 7), the corresponding measuring results are compiled. From Table 5 in FIG. 5, the influence of the temperature on the polymerisation conditions can be detected. FIG. 5 shows in a persistent manner that polymers can be obtained with the catalyst combination according to the invention which not only have an extremely high molecular weight up to 800,000, but which have at the same time also very high tacticity relative to mmmm-pentadiene.

The influence of the monomer concentration can be deduced from FIG. 6.

FIG. 7 then also reproduces the measuring results which are obtained during polymerisation in liquid propylene.

In summary, it should hence be emphasised that in particular the hafnium complex (7) has outstanding properties with respect to the polymerisation.

The invention claimed is:

1. Catalyst combination for producing linear isotactic polymers containing (i) an asymmetrical metal complex of the general formula I,

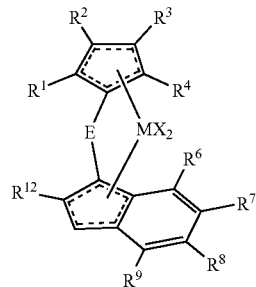

(I)

wherein $R^1$-$R^4$ are linear or branched $C_1$- to $C_{10}$-alkyl, 5- to 7-membered cycloalkyl, optionally substituted with one or more $C_1$- to $C_6$-alkyl radicals, $C_6$- to $C_{18}$-aryl or arylalkyl or alkylaryl, or $R^1/R^2$, $R^3/R^4$ being able to be bonded in 5- to 7-membered cycloalkyl or aryl rings;

$R^6$-$R^9$ are hydrogen, linear or branched $C_1$- to $C_{10}$-alkyl, 5- to 7-membered cycloalkyl, optionally substituted with one or more $C_1$- to $C_6$-alkyl radicals, $C_6$- to $C_{18}$-aryl or arylalkyl or alkylaryl, with the proviso that the radicals $R^6/R^7$ or $R^8/R^9$ are bonded in 5- to 7-membered anellated cycloalkyl or aryl rings, the latter being optionally substituted, interrupted with heteroatoms and/or combined with a further cycloalkyl and/or aryl ring;

$R^{12}$ is $C_1$- to $C_8$-alkyl, aryl, $C_1$- to $C_8$-oxyalkyl, or $C_1$- to $C_8$-trialkylsiloxy;

M is titanium, zirconium, hafnium, vanadium, niobium, or tantalum;

X is hydrogen, halogen, $C_1$- to $C_8$-alkyl, aryl, or benzyl;

E is carbon, silicon, germanium, 1,2-ethylene, 1,3-propylene, or 1,4-butylene, wherein when E is carbon, silicon, or germanium, E is optionally substituted with $R^{10}$ and $R^{11}$;

$R^{10}$-$R^{11}$ are hydrogen, $C_1$- to $C_8$-alkyl, 4- to 7-membered cycloalkyl, or aryl, or $R^{10}$, $R^{11}$ together with E being able to form a 4- to 7-membered cycloalkyl or aryl;

and (ii) an activator.

2. Catalyst combination according to claim 1, wherein the metal complex according to the general formula I is a compound of the general formula II,

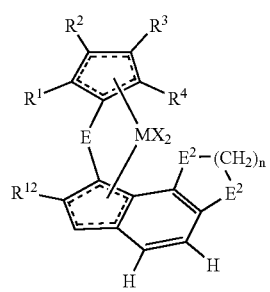

(II)

in which the radicals $R^1$ to $R^4$ and $R^{10}$ to $R^{12}$ and also E and $MX_2$ have the meaning indicated in the general formula I and $E^2$ =CH$_2$, O or S and n=1 or 2, $E^2$ able to be the same or different.

3. Catalyst combination according to claim 1 wherein the metal complex according to the general formula I is a compound of the formula III,

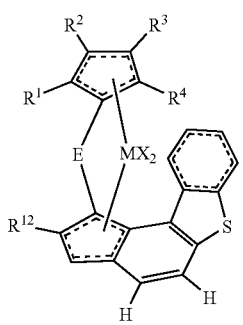

(III)

in which the radicals $R^1$ to $R^4$ and $R^{10}$ to $R^{12}$ and also E and MX$_2$ have the meaning indicated in the general formula I.

4. Catalyst combination according to claim 1, wherein the metal complex according to the general formula I is a compound of the general formula IV,

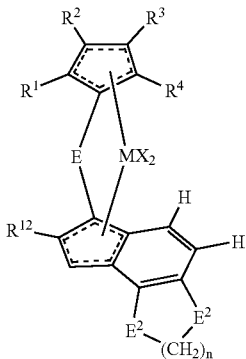

(IV)

in which the radicals $R^1$ to $R^4$ and $R^{10}$ to $R^{12}$ and also E and MX$_2$ have the meaning indicated in the general formula I, $E^2$ being able to be the same or different.

5. Catalyst combination according to claim 1, wherein the metal complex according to the general formula I is a compound of the formula V,

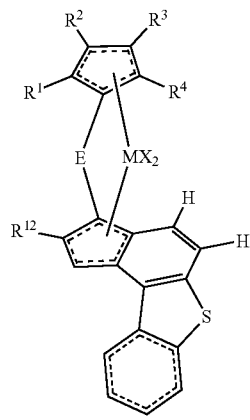

(V)

in which the radicals $R^1$ to $R^4$ and $R^{10}$ to $R^{12}$ and also E and MX$_2$ have the meaning indicated in the general formula I.

6. Catalyst combination according to claim 1, wherein the activator is an open-chain or cyclic alumoxane compound of the general formula VI or VII,

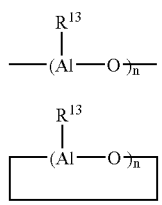

(VI)

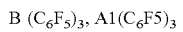

(VII)

wherein $R^{13}$ is a $C_1$- to $C_4$-alkyl group and n is a number between 5 and 30, and/or being a cationic activator of the general formulae VIII to XI, B (C$_6$F$_5$)$_3$, Al(C$_6$F5)$_3$ (VIII)

$R^{14}{}_3$C[B(C$_6$F$_5$)$_4$], $R^{14}{}_3$C[Al(C$_6$F$_5$)$_4$] (IX)

[$R^{14}{}_3$NH][B(C$_6$F$_5$)$_4$], [$R^{14}{}_3$NH][Al(C$_6$F$_5$)$_4$] (X)

$R^{14}{}_3$C [C$_5$R$^{15}{}_5$], ]$R^{14}{}_3$NH][C$_5$R$^{15}{}_5$]

wherein $R^{14}$ is a $C_1$- to $C_4$-alkyl group or an aryl group and $R^{15}$ is a perfluorinated alkyl or aryl radical.

7. Catalyst combination according to claim 1, wherein the quantity ratio between metal complex and activator is chosen such that the atomic ratio between aluminium from the alumoxane and/or boron\aluminium from the cationic activator and the transition metal from the metal complex is present in the range of 1:1 to 10$^6$:1.

* * * * *

UNITED STATES PATENT AND TRADEMARK OFFICE
CERTIFICATE OF CORRECTION

| | |
|---|---|
| PATENT NO. | : 7,381,679 B2 |
| APPLICATION NO. | : 10/543703 |
| DATED | : June 3, 2008 |
| INVENTOR(S) | : Rieger et al. |

It is certified that error appears in the above-identified patent and that said Letters Patent is hereby corrected as shown below:

On item [54] and Col. 1, lines 1-4.
The Title, "CATALYST COMBINATION, ISOTACTIC POLYMERS AND ALSO A METHOD FOR PRODUCING LINEAR ISOTACTIC POLYMERS AND THE USE THEREOF" should read --CATALYST COMBINATION, ISOTACTIC POLYMERS, METHOD FOR PRODUCING LINEAR ISOTACTIC POLYMERS, AND THE USE OF SAID POLYMERS--.

Claim 7, Column 18, line 53, "boronaluminium" should read --boron/aluminium--

Signed and Sealed this

Thirtieth Day of September, 2008

JON W. DUDAS
*Director of the United States Patent and Trademark Office*